Patented July 30, 1935

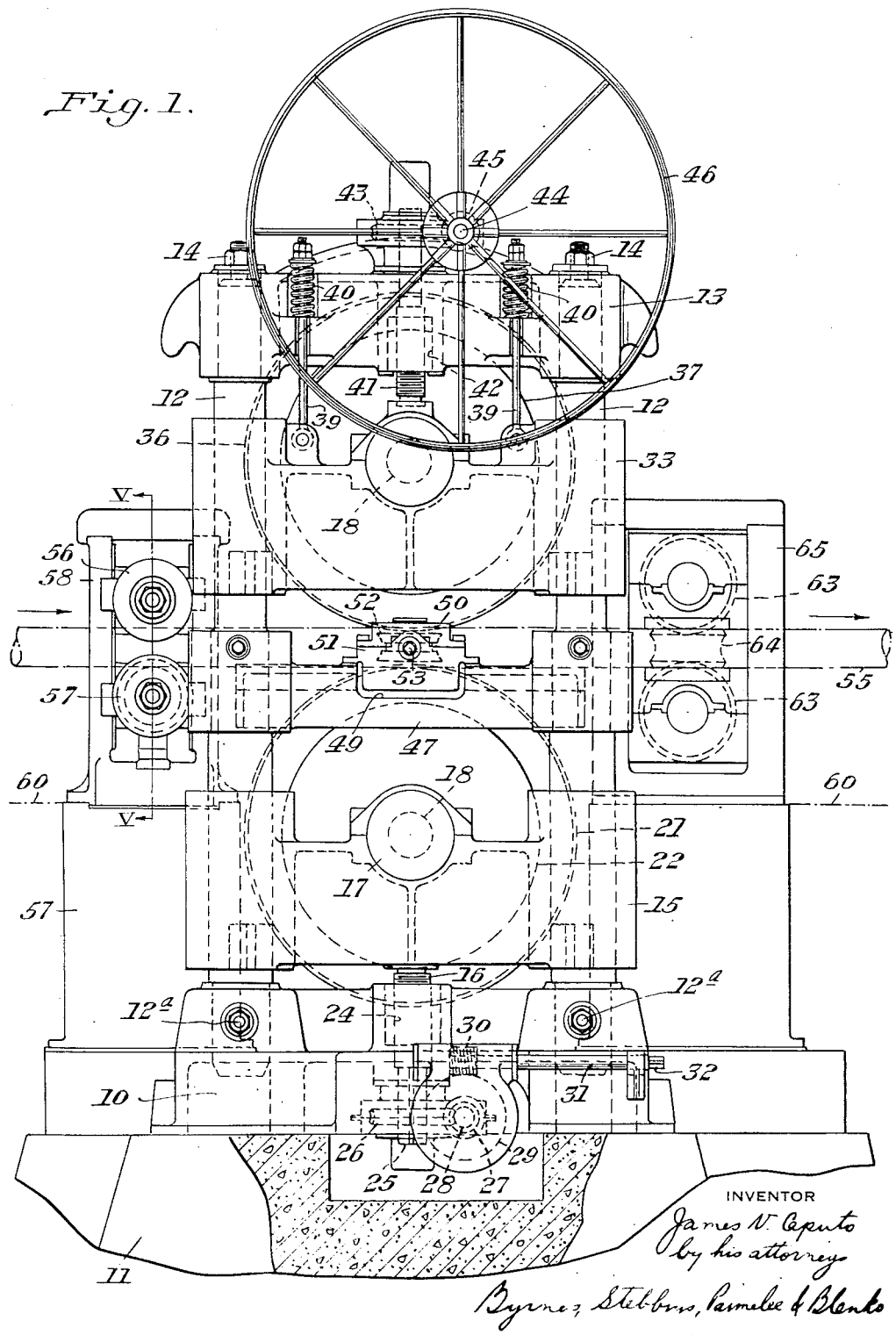

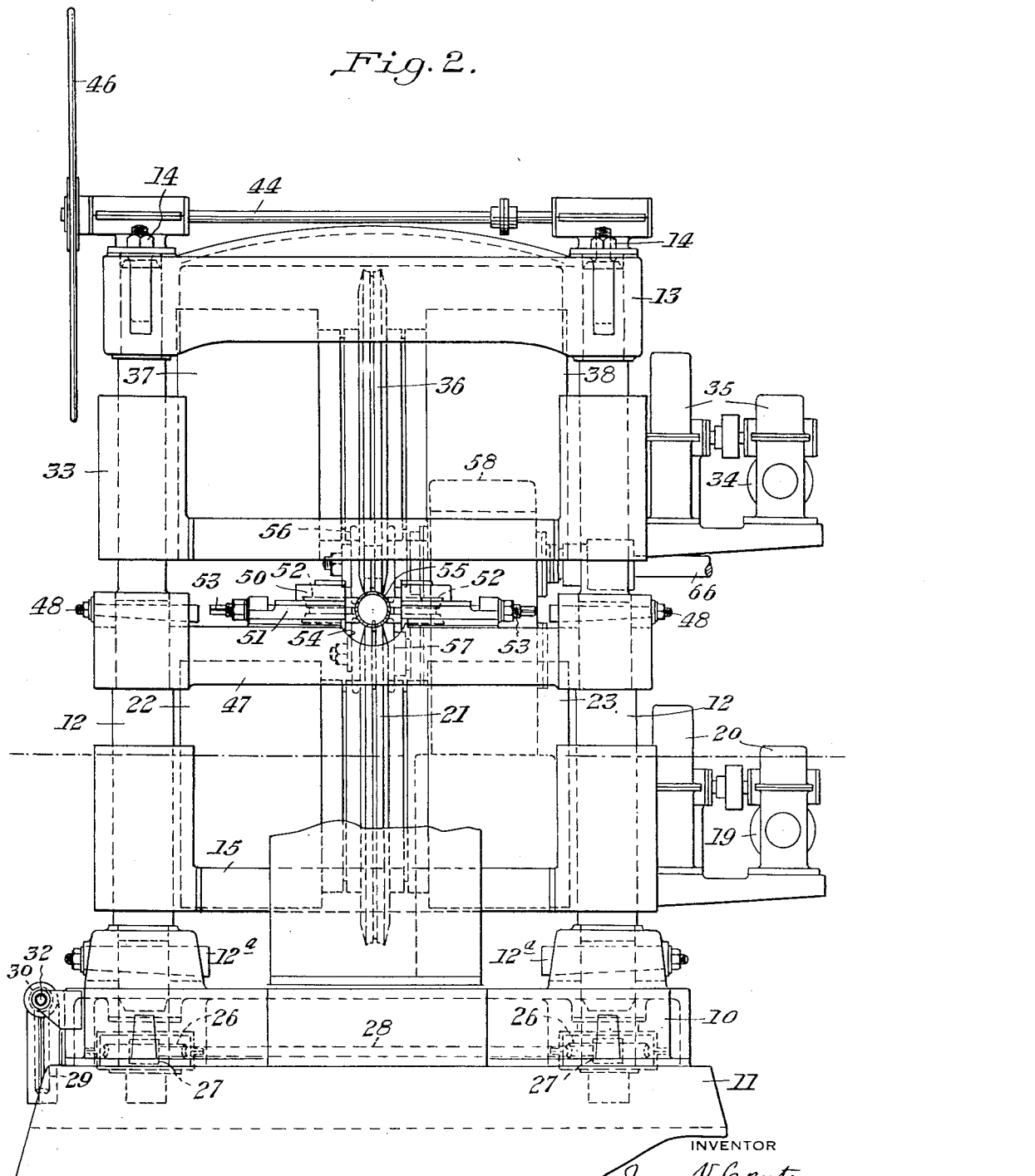

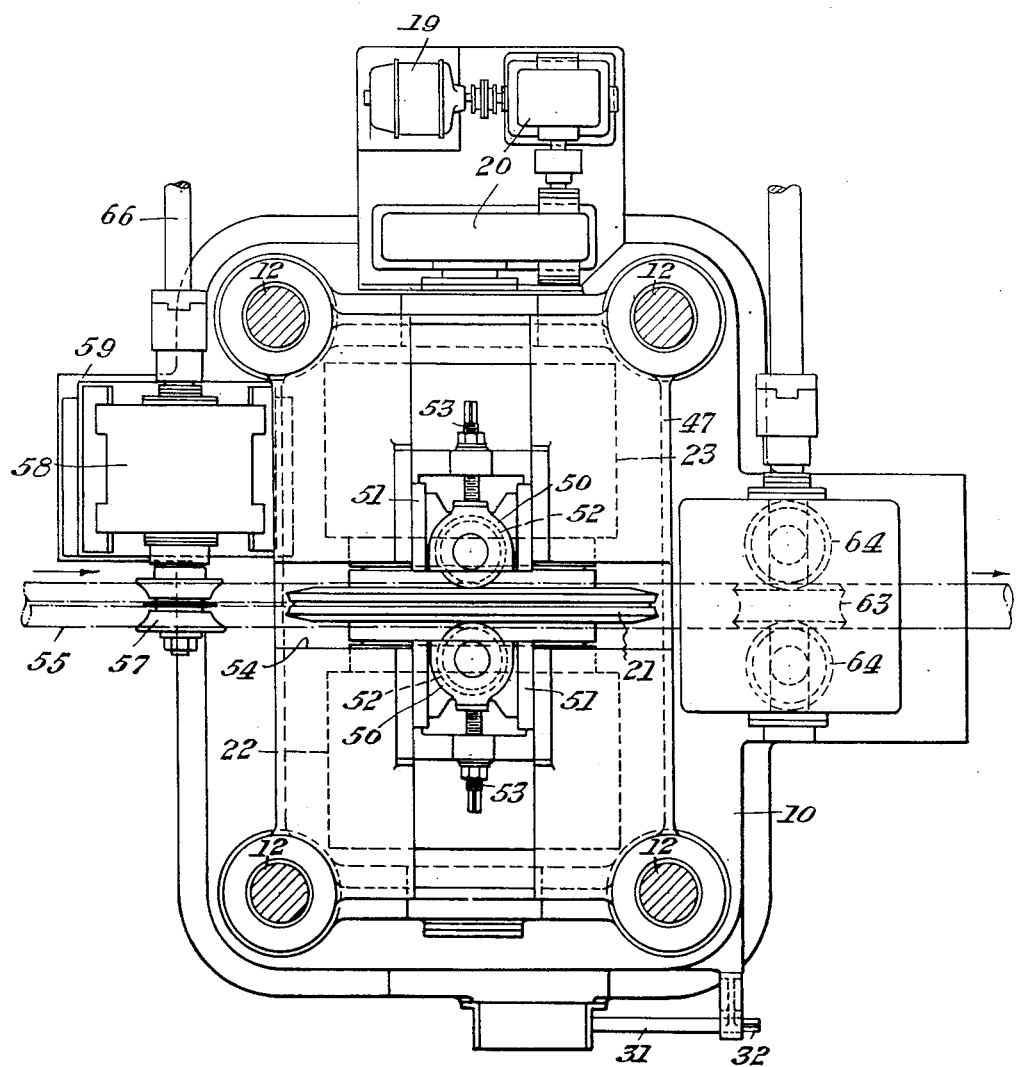

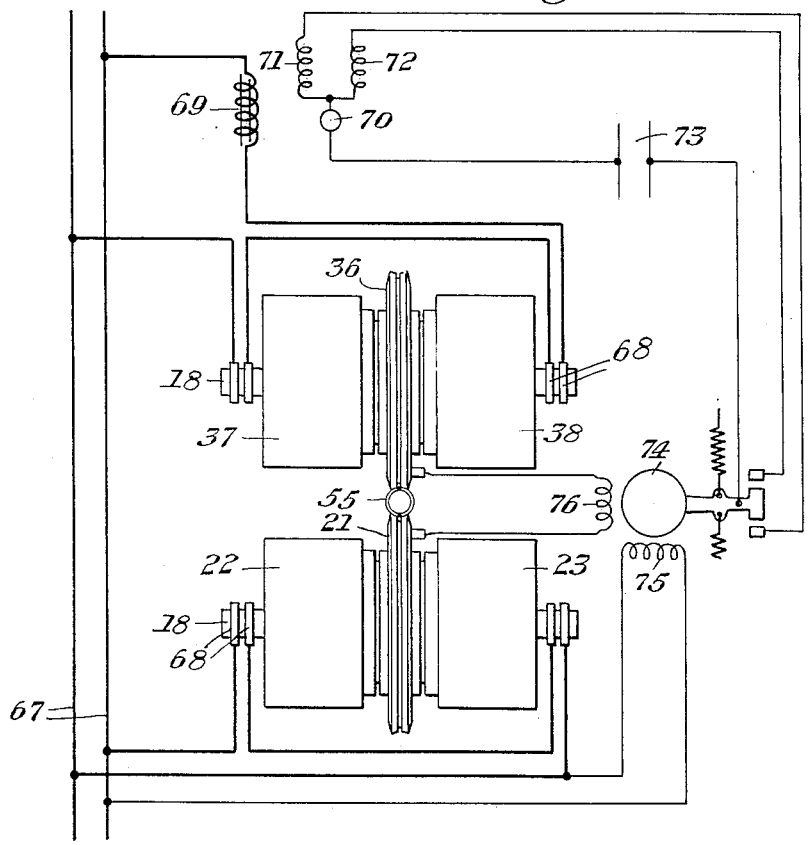
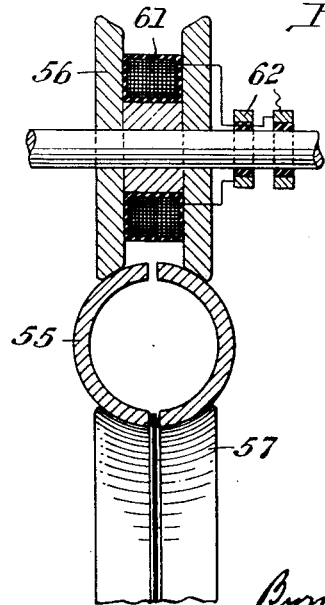

2,009,685

UNITED STATES PATENT OFFICE 2,009,685

APPARATUS FOR WELDING

James V. Caputo, Crafton, Pa.

Application September 3, 1931, Serial No. 560,989

26 Claims. (Cl. 219—6)

My invention relates to a method and apparatus for welding and, in particular, to a method and apparatus for welding pipe from cylindrically formed skelp.

This application is a continuation-in-part of my copending application, Serial No. 433,621, filed March 6, 1930.

One of the objects of my invention is to provide a method and apparatus whereby double seam pipe can be welded by the continuous electric resistance method. Another object is to provide a method of normalizing the portion of cylindrically formed skelp intermediate the edges of the seam cleft therein to remove the strains introduced therein by the forming process.

It is a further object of the invention to provide means for controlling the current supplied to opposite seams of a double seam pipe during welding in order to prevent excessive circulating currents.

In accordance with my invention, I provide a welding apparatus comprising a base having columns or posts upstanding therein connected at their upper ends by a top or head casting. Top and bottom carriages adjustably supported and guided by said posts provide bearings for a pair of vertically alined transverse shafts. On each shaft, I position a welding electrode comprising a split disc and a plurality of transformers for supplying current to said electrode.

Between the carriages supporting the electrodes and transformers, I position a fixed carriage supporting side pressure rolls for engaging formed skelp being passed through the welder.

A stand of feed rolls is provided at one end of the welder for advancing pipe therethrough and one of the rolls of said stand may be magnetic so as to seize the skelp firmly. A stand of sizing rolls at the exit end of the welder reduces the pipe to proper size.

An automatic control system for varying the voltage of the transformers is responsive to the current circulating in the skelp.

For a clear understanding of the invention, reference is made to the accompanying drawings illustrating the present preferred embodiment thereof. In the drawings, Figure 1 is a view in side elevation of the welding apparatus of my invention;

Figure 2 is an end view thereof;

Figure 3 is a sectional view taken substantially along the line of the axis of the pipe passing through the welder;

Figure 4 is a schematic diagram illustrating the circuits and control system for the welder; and Figure 5 is a partial sectional view along the line V—V of Figure 1.

Referring in detail to the drawings, the welder includes a base 10 secured to a suitable foundation 11. Posts or columns 12 are seated in the corners of the base casting 10 and secured through pins 12a. A top or head casting 13 is supported on the reduced ends of the posts 12 and secured thereto by nuts 14.

A bottom carriage 15 is slidably supported from the base 10 by adjusting screws 16. The carriage 15 is guided on the posts 12 and is provided with bearings 17 for a transverse shaft 18. An extension on the carriage supports a motor 19 and speed reducing gearing 20 for driving the shaft 18. An overspeed clutch is incorporated in the shaft drive.

Centrally of the shaft 18, a divided electrode 21 is mounted. On each side of the electrode 21, groups of transformers indicated in outline at 22 and 23 are positioned to supply current to the electrode.

Adjusting screws 16 for supporting the bottom carriage 15 traverse nuts 24 seated in the base casting 10. The lower ends of the screws are squared as at 25 and have slidably mounted thereon worm wheels 26. The worm wheels 26 mesh with worms 27 carried on a shaft 28 journaled in the base. A worm wheel 29 is also keyed to said shaft 28 and is in mesh with a worm 30 keyed on a shaft 31. The shaft 31 is journaled in the base casting and has a squared end 32 for receiving a crank or wrench. The shaft 28 extends the entire width of the base casting so that both screws are correspondingly adjusted.

A top carriage is similar in all respects to the bottom carriage 15 and is provided with its own driving motor 34 and speed reducing gear 35, as well as an electrode 36 and transformer groups 37 and 38. The top carriage 33 is suspended from the head casting 13 by means of hangers 39 and compression springs 40. The adjustment of the top carriage is controlled by screw-downs 41 which traverse nuts 42 in the head casting. The upper ends of the screws 41 are squared for, slidably receiving worm wheels 43. A shaft 44 extending transversely of the welder and journaled in suitable bearings on the head 13 is provided with worm wheels 45 meshing with the worm wheels 43. A hand wheel 46 on the shaft 44 provides means for simultaneously adjusting the screw-downs at both sides of the welder.

Between the top and the bottom carriages, a fixed carriage 47 is seated on shoulders formed in the posts 12 and is secured thereto by pins 48. The carriage 47 is provided with a transverse channel 49. In the channel 49, pressure roll housings 50 are supported by guideways 51. Side pressure rolls 52 are mounted in said housings and the latter are adjustable by means of adjusting screws 53. The carriage 47 is also provided with a longitudinal groove 54 to provide clearance for a pipe indicated at 55 passing through the welder.

Feed rolls 56 and 57 are carried on overhung shafts journaled in housings 58. The housings 58 are supported on a base 59 which rests on an extension of the base casting 10. The latter may conveniently be depressed below the floor line indicated generally at 60. The feed roll 57 is illustrated as provided with a central fin for entering the bottom seam cleft in the case of double seam welding. Where single seam welding is practiced, this roll will be replaced with a smooth roll without the fin. The roll 56 may be of the construction illustrated in Figure 5. As illustrated in Figure 5, the roll 56 is of spool shape and is provided with an exciting winding 61. This winding may be energized through slip rings 62 and, when so energized, the flux traversing the magnetic circuit comprising the spool-shaped roll 56 and the semi-cylindrical formed skelp to be welded into the pipe 55, causes the skelp to be firmly gripped by the roll. The chance of slippage of the roll on the skelp is thus reduced and a more positive drive provided.

At the exit end of the welder, sizing rolls 63 and 64 are journaled in a housing 65. The rolls 63 are mounted on a horizontal axis, while the rolls 64 are on a vertical axis. Together, the four rolls grip the pipe throughout substantially its entire circumference and exert the desired sizing pressure thereon. The usual adjusting means will be incorporated in the housings 58 and 65 to permit shifting of the feed rolls and the sizing rolls. A driving shaft for the feed rolls is indicated at 66. The sizing rolls 63 and 64 may be similarly driven by a shaft as shown in Figure 3.

Referring now to Figure 4, electrical energy for welding and normalizing is supplied to the transformer groups 22, 23, 37 and 38 from a high voltage supply line 67. As shown in Figure 5, the transformer groups on each shaft are connected in series to the supply circuit by slip rings 68. The connections between the transformer secondaries and the electrodes 21 and 36 are not illustrated but are short rigid connections of low resistance which are firmly incorporated in the rotary structure supported by the shafts 18. A variable reactor 69 is connected in series with the transformer groups 37 and 38. This reactor is adjustable by means of a motor 70 having forward and reverse fields 71 and 72 connected in series therewith to a source of control current 73 through a relay 74.

It will be assumed that the source 67 is a substantially constant voltage current source and that the secondary voltage of the transformers in the groups 22 and 23 is substantially constant for a given adjustment of the usual control devices not shown. It is desirable, of course, that the secondary voltages of the transformers on the two shafts 18 be identical in order to prevent a circulation of current in the pipe 55. It will be apparent that any difference in voltage across the top and bottom seams of the pipe will set up circulating currents through the skelp halves.

In order to regulate the voltage across the top seam of the pipe, relay 74 is provided. This relay operates on the Watt meter principle and has a voltage winding 75 connected directly across the source 67. The current winding 76 is connected across corresponding terminals of the electrodes 21 and 36. If any current supplied to the skelp halves tends to circulate therethrough without crossing one of the seams, the winding 76 will be energized since it is in parallel with the path of the circulating current. The relay 74 will be operated immediately to effect the proper adjustment of the reactor 69 by means of the motor 70. The reactor 69 may be an induction regulator or an equivalent controlling device. When the proper adjustment of the regulator has been effected, the circulating current will cease and the relay 74 will return to the neutral position in which it is illustrated.

Although the description of the invention has been directed to the welding of double seam pipe, it will be apparent that, as previously suggested, single seam pipe may be welded and normalized in one operation by the use of the apparatus shown herein. When the apparatus is used for this purpose, the electrode supplying normalizing current will be similar to the welding electrodes shown at 21 and 36, except that the conducting portions of the electrode will be more widely spaced than shown in order that a wider zone of the formed skelp will be subjected to the heating produced by the passage of current therethrough. In single seam welding, the skelp may be positioned so that the seam is on top or on the bottom. In either case, one electrode supplies welding current to the ends of the seam cleft while the other supplies current to the continuous portion of the skelp to heat the latter to normalizing temperature. Any internal strains introduced in the forming of the skelp are thus relieved.

It will be apparent from the foregoing description that the invention provides a very satisfactory and efficient method and apparatus for the welding of double seam pipe or the welding and simultaneous normalizing of single seam pipe. In addition, a simple and positive apparatus and method for controlling the voltage across one seam of a pipe being welded in accordance with the voltage across another portion of the pipe is made available. The magnetic roll for feeding pipe to the welder affords a positive grip on the pipe and prevents slipping. The entire apparatus, as shown, has been designed with a view to providing a welding method and apparatus of unquestioned practicability, as well as simplicity in construction and a high efficiency in operation. The advantage of using transformers which rotate with the electrodes so that short permanent connections therebetween may be made are well known. The apparatus is capable of a wide range of adjustments and is adaptable for the manufacture of different sizes of pipe with but little change in the equipment described.

Although I have described herein but a single preferred embodiment of the invention, it will be realized that any changes in the details disclosed may be made without departing from the spirit of the invention as defined in the appended claims.

I claim:

1. A welder comprising a base, columns therein, a bottom carriage slidable on said columns, screw mechanism in said base for supporting said carriage, and a shaft supported in said carriage, an electrode and transformers on said shaft, a center carriage on said columns, side pressure rolls thereon, a head casting supported on said columns, a top carriage resiliently suspended therefrom, screw mechanism for adjusting the top carriage, a shaft in said top carriage, and an electrode and transformers mounted on said last mentioned shaft.

2. In a welder, a base, columns therein, top and bottom carriages slidable on said columns and having shafts journaled therein, each shaft being provided with an electrode and transformers, a head casting on said columns, means for supporting the top carriage from the head casting, means for supporting the bottom carriage from the base, and a central carriage on said columns having pressure rolls therein.

3. In a welder, a base, a plurality of columns therein, a pressure roll frame fixed thereto and a head casting thereon, pressure rolls adjustably carried on said frame, shaft bearings slidable on said columns, shafts journaled therein above and below said frame, adjustable supporting means for the bearings and a disc electrode and transformers on each of said shafts.

4. A welder comprising a base, posts therein, bearings for upper and lower shafts slidable on said posts, adjusting means therefor and upper and lower shafts therein, a disc electrode and transformers on each of said shafts, a pressure roll frame fixed to said posts between said shafts, pressure rolls adjustably carried on said frame, said rolls cooperating to engage, and said electrodes to supply current to, spaced points on the circumference of formed skelp.

5. In a welder, a frame including a base, posts and a top, a pair of transverse shafts journaled in bearings slidable on said posts, adjusting means on the top and base for said bearings, a disc electrode and transformers on each of said shafts, and a motor drive for each of said shafts carried on its bearing structure and movable therewith.

6. A pipe welder comprising a base, posts therein and a top supported thereon, a stand of feed rolls at one end of the base, a stand of sizing rolls at the other end, a pair of transverse shafts journaled in bearings slidable on said posts, a disc electrode and transformers on each of said shafts, adjusting means on the top and base for the shaft bearings, and pressure rolls supported on said posts for engaging a formed tube receiving current from said electrodes.

7. The combination with a frame comprising a base, top and posts, of a pair of welder units slidably mounted on said posts in vertical alinement, each unit comprising a shaft, a disc electrode and transformers on said shaft, and a motor drive for the shaft.

8. A double seam welder comprising a frame, including a base and posts thereon, top and bottom welding units adjustably supported on said posts, each unit consisting of a transverse shaft, bearings therefor, a disc electrode and transformers on the shaft and a motor drive therefor, and side pressure rolls between said electrodes adjustably carried on a frame supported by said posts.

9. A pipe welder and normalizer comprising a frame, top and bottom current supplying units supported therein, each including a disc electrode and transformers rotatable therewith, side pressure rolls carried on said frame between said units, and feed rolls and sizing rolls at opposite ends of the frame.

10. The combination with a double seam pipe welding apparatus having means for simultaneously supplying current to two seams to be welded, of means for controlling said first mentioned means in accordance with the voltage difference between said seams.

11. The combination with a welding apparatus for welding together a pair of semi-cylindrical pieces of formed skelp, including means for supplying welding current to said seams, of means for controlling the current supplied by said first mentioned means in accordance with the voltage difference between the said seams.

12. In a welding apparatus, the combination with independent means for simultaneously supplying current to spaced points on the circumference of a pipe being welded, of means for controlling one of said first mentioned means in accordance with the voltage difference between said points.

13. A pipe welding apparatus comprising electrodes for supplying current to spaced points on the circumference of a pipe to be welded, transformers for delivering current to said electrodes, means for controlling the transformers supplying current to one of said electrodes, and a relay responsive to the difference in voltage between said points for adjusting said controlling means.

14. The combination with a pair of opposed electrodes, transformers for supplying current to each of said electrodes, a reactor in circuit with the transformer supplying current to one of said electrodes, and a relay responsive to current circulating between said electrodes through said pipe for controlling the adjustment of said reactor.

15. A welder comprising a base, columns therein, a bottom carriage slidable on said columns, screw mechanism in said base for supporting said carriage, welding means on said carriage, a center carriage on said columns, side pressure rolls thereon, a head supported on said columns, a top carriage resiliently suspended therefrom, screw mechanism for adjusting the top carriage, welding means on last-mentioned carriage.

16. In a welder, a base, columns therein, top and bottom carriages slidable on said columns, welding means on said carriages, a head on said columns, means for supporting the top carriage from the head, means for supporting the bottom carriage from the base, and a central carriage on said columns having pressure rolls.

17. In a welder, a base, a plurality of columns therein, a pressure roll frame fixed thereto and a head thereon, pressure rolls adjustably carried on said frame, shafts journaled therein above and below said frame, adjustable supporting means for the bearings, and welding means on each of said shafts.

18. A welder, comprising a base, posts therein, bearings slidable on said posts for receiving upper and lower shafts, adjusting means for said bearings and upper and lower shafts therein, welding means on each of said shafts, a pressure roll frame fixed to said posts, between said shafts, pressure rolls adjustably carried on said frame, said rolls cooperating to engage, and said welding means to supply current to, spaced points on the circumference of formed skelp lengths.

19. The combination with a frame comprising a base, top and posts, of a pair of welder units slidably mounted on said posts in vertical alignment, each welding unit being mounted on a shaft, and a motor drive for the shafts.

20. The combination with a frame, comprising a base, top and connecting posts, of a pair of welder units slidably mounted on said posts in vertical alignment, and driving means for each welder unit.

21. In a welding machine for welding a plurality of seams in a formed member, the combination with a frame comprising a base, top, and connecting posts, of a pair of welder units slidably mounted on said posts on opposite sides of said member, means for moving said welder units toward and away from the seams, said seams being between the welder units.

22. In a machine for welding a plurality of seams, the combination with a frame including a plurality of columns, of a pair of opposed welder units and means for supporting a work piece therebetween, each of said units comprising a carriage slidable on said columns, a shaft journaled thereon, an electrode on the shaft, and a current source connected to the electrode.

23. In a welding machine for simultaneously welding a plurality of seams, the combination with a frame, work-supporting means including a support adjustable on the frame, and side pressure rolls journaled on the support, of means for progressively moving the work through the machine, and welder units on opposite sides of said support, each of said units comprising a carriage adjustable on the frame, a shaft journaled in the carriage, an electrode on the shaft, and a transformer connected to the electrode.

24. The apparatus defined by claim 23 characterized by means for adjusting the welder units toward and away from the pressure roll support.

25. The apparatus defined by claim 23 characterized by means for rotating said shafts to drive said welder units.

26. In an apparatus for welding, a frame, a pair of welder units adjustable in said frame, side pressure rolls adjustably supported between the welder units, a feed roll stand on one side of said frame, and a sizing roll stand on the opposite side of said frame.

JAMES V. CAPUTO.